United States Patent Office 3,842,172
Patented Oct. 15, 1974

3,842,172
PHARMACEUTICAL COMPOSITIONS CONTAINING A 4 - SUBSTITUTED - 2 - (3 - PYRIDYL) THIAZOLE AND METHODS OF USING SAME
Zaven S. Ariyan, Middleroad, Conn., and William A. Harrison, Guelph, Ontario, Canada, assignors to Uniroyal, Inc., New York, N.Y., and Uniroyal Ltd., Montreal, Quebec, Canada
No Drawing. Filed Oct. 6, 1972, Ser. No. 295,503
Int. Cl. A61k 27/00
U.S. Cl. 424—263
24 Claims

ABSTRACT OF THE DISCLOSURE

Certain 4-substituted - 2 - (3-pyridyl)thiazoles are useful as anti-aggression agents.

CROSS REFERENCE TO RELATED APPLICATIONS

This application is related to, and incorporates by reference, the contents of application of Harrison et al., Ser. No. 140,571, filed May 5, 1971, and of our application Ser. No. 264,817, filed June 21, 1972.

BACKGROUND OF THE INVENTION

1. Field of the Invention

The neurochemistry of aggression has recently attracted much attention, it having been recognized that aggressive behavior in animals and man can be produced by alterations in ordered brain function. In man, aggressive behavior is very often associated with almost every type of mental disease. Thus, aggression is a major side effect of most mental disorders.

This invention relates to the use of certain 4-substituted-2-(3-pyridyl)thiazoles, all of said thiazoles being known compounds, as psychotherapeutic agents, particularly as anti-aggression agents. Thus, certain of these thiazoles have been found to be highly selective for the abolition of aggressive behavior at doses which cause little or no signs or symptoms of central nervous system depression or toxicity.

It is well accepted in neuropharmacology that there is no clear distinction between sedative-hypnotics and minor tranquilizers. Virtually all known minor tranquilizers which are effective in reducing anxiety also produce drowsiness, ataxia (inability to coordinate muscular movements), and sleep when given in larger doses. Virtually all sedative-hypnotic drugs in small doses are "anxiolytic" (causing apprehension or anxiety). Sedative hypnotics such as alcohol and short-acting barbiturates tend to produce behavioral excitation prior to promoting drowsiness and sleep. The sedative-hypnotics and minor tranquilizers produce discrete, predictable changes of behavior that can be applied to therapeutic advantage in neurotics. Aside from their ability to promote sleep, their major behavioral action of therapeutic advantage is their ability to slightly reduce the level of arousal-excitability, overcome passive avoidance (social withdrawal, suppressed or submissive behavior), slightly diminish aggressive hostility, and increase the response to environmental stimuli. The effect, for example, of a "psychomimetic" drug (inducing psychosis-like symptoms) on animal behavior, such as LSD in rats and cats, has been said to increase excitement and aggression.

Currently, aggressive behavior in mental disease patients is usually controlled by such major tranquilizers as chlorpromazine. This approach to the problem of controlling mental disorders is not entirely satisfactory since patients under the influence of this type of medication are overtly depressed and have difficulty in satisfactorily returning to society and in functioning normally. Chlorpromazine is a strong central nervous system depressant, both in normal and schizophrenic patients. It has been the drug of choice for the treatment of so-called "back ward" schizophrenics, and is now used in out-patient therapy in cases of simple schizophrenia. The compound has many side effects, the most serious being that it causes depression at the same time that it alleviates the schizophrenic symptoms. It also is disadvantageous in that it is extremely toxic and has been known to cause liver damage and blood disorders.

The abolition of aggressive behavior in schizophrenics without neurotoxicity as characterized by depression would be a most desirable feature for a new drug in the therapy of mental disease. The thiazole compounds of the present invention have been found to selectively block aggressive behavior but without causing significant depression.

Accordingly, in one aspect, the invention is a method of treating aggressive behavior. In another aspect, the invention is directed to psychotherapeutic pharmaceutical compositions comprising certain 4-substituted-2-(3-pyridyl)thiazoles.

2. Description of the Prior Art

Thiazole derivatives, including numerous pyridyl thiazoles, are, of course, known.

French patent application FM0008423, for example, discloses certain thiazole derivatives as having anti-inflammatory activity. These compounds are structurally dissimilar to the compounds employed in the present invention in that they are all substituted in the pyridyl ring by a group such as =O, =S, —OR or —SR. The compounds employed in the present invention, on the other hand, do not contain any such groups in the pyridyl rings thereof.

Dutch patent application 70/07029 discloses a group of 2 - (3 - pyridyl)thiazolylacetic acid derivatives as having anti-inflammatory activity.

The application of Harrison et al., noted above, discloses a broad class of 2-(3-pyridyl)thiazoles and methods for preparing same. According to the application of Harrison et al., 2-(3-pyridyl)thiazoles are prepared by well known methods of thiazole synthesis. Thus, in broad outline, as described in Harrison et al., in greater detail, a thioamide of the formula:

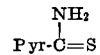

is reacted with an alpha-halocarbonyl compound of the formula:

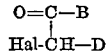

in the presence of a solvent such as alcohol with heating, followed by basification to form a compound of the formula:

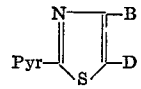

wherein Pyr is a pyridyl or an alkyl-substituted pyridyl group, B is an alkyl group, a carboxylate group or a carbamoyl group, D is, e.g., a carbamoyl or a mono- or di-substituted carbamoyl group and Hal is a halogen.

SUMMARY OF THE INVENTION

The present invention provides a method of controlling aggressive behavior in an animal subject without causing the central nervous system depression which is a typical side effect of drugs heretofore used to treat aggressive behavior. This is achieved by administering to an animal subject a therapeutically effective amount of a specified 4-substituted-2-(3-pyridyl)thiazole or of a pharmaceutically acceptable acid addition salt thereof.

The thiazole compounds that are employed in this invention may be represented by the following formula:

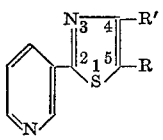

wherein R' is lower alkyl such as methyl; carboxamide

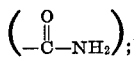

or N-substituted carboxamide such as

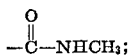

and wherein R is hydrogen;

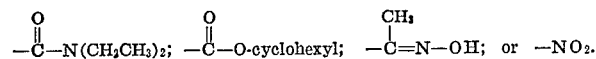

The foregoing thiazole compounds may also be employed in the form of their pharmaceutically acceptable acid addition salts, e.g., hydrochlorides, sulfates, hydrobromides, hydroiodides, sulfonates, and the like.

Generally, the amount of such thiazole that will be administered will be from about 0.1 to 100 mg./kg./day of body weight, preferably from about 1 to 25 mg./kg./day. In humans, the amount will be from about 0.5 to 2 mg./kg./day.

The invention further provides new pharmaceutical compositions comprising one of the above specified 4-substituted-2-(3-pyridyl)thiazoles.

Such pharmaceutical compositions comprise, in combination, a therapeutically effective amount of such a thiazole and a pharmaceutically acceptable carrier or diluent therefor.

For example, in the case of a tablet, the composition will comprise, in addition to the active ingredient, fillers, binders and diluents such as lactose, methylcellulose, talc, gum tragacanth, gum acacia, agar, polyvinylpyrrolidone, stearic acid and corn starch. In the case of a liquid suspension for oral administration, the composition will comprise, in addition to the active ingredients, a filler such as sodium carboxymethyl-cellulose and/or a syrup, e.g., a glycerine based syrup. In the case of a parenteral solution or suspension, the composition will comprise the active ingredient and a suitable liquid solvent or dispersant such as a saline solution.

DETAILED DESCRIPPTION OF THE INVENTION

The thiazole compounds that are employed as psychotherapeutic agents in the present invention may be represented by the following formula:

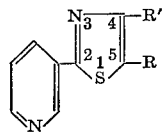

wherein R' is lower alkyl such as methyl; carboxamide

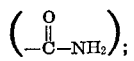

or N-substituted carboxamide such as

and wherein R is hydrogen;

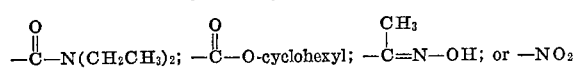

The foregoing thiazole compounds may also be employed in the form of their pharmaceutically acceptable acid addition salts, e.g., hydrochlorides, sulfates, hydrobromides, hydroiodides, sulfonates, and the like.

The salts of the present invention may be represented by the formula:

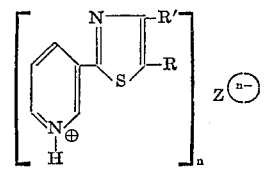

wherein R and R' are as defined above, Z is an anion derived from an acid which is pharmaceutically acceptable and whose pk value is between about 0.4 and 3.5, and $n$ is an integer from 1 to 3 equal to the charge on the anion.

A preferred thiazole compound is 3-(4-methyl-5-nitro-2-thiazolyl)pyridine hydrochloride, which is represented by the following formula:

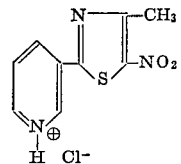

As indicated previously, the compounds of the present invention can be prepared by well known methods of thiazole synthesis such as the syntheses described in the application of Harrison et al. mentioned above. Compound 2 of Table I below, which may be described as the oxime of methyl 4-methyl-2-(3-pyridyl)-5-thiazolyl ketone, can be made by reacting the ketone with hydroxylamine by any of several well-known methods. Typically, the ketone.

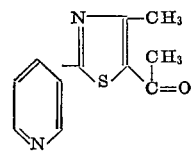

is first prepared as outline above, that is, by reacting 3-chloro-2,4-pentanedione with thionicatinamide. Then, the ketone is heated with a mixture of hydroxylamine hydrochloride and sodium acetate in aqueous ethanol.

The most outstanding property of the thiazole compounds of the present invention is their highly selective abolition of aggressive behavior in doses which cause little or no signs or symptoms of central nervous system depression or toxicity.

Two models of aggression are used in the primary screening for neutroleptics: (1) isolation-induced fighting in mice and (2) aggression induced in rats by destruction of the septal area (septal rat). Compounds are first submitted to the neuropharmacological profile, a standard procedure (see, e.g., Samuel Irwin, Science, 136, 123 [1962]) employed in screening a compound to determine its usefulness as a Central Nervous System active compound. Those agents which cause depression over a wide dose range are then submitted to the first anti-aggression screen, the isolation-induced fighting mouse assay. As indicated in Table I, compounds which protect at least 40% of the mice in this test are considered to be active as anti-aggression agents. Tests for neurotoxicity are performed concomitantly with the anti-aggression tests. Potency ratios are established between the mean dose which cause neutrotoxicity. ($NTD_{50}$) and that dose which abolishes aggressive behavior ($ED_{50}$). Compounds having a potency ratio of greater than one are considered promising candidates for further developmental work.

Since they possess outstanding anti-aggressive activity in doses which cause little or no signs of central nervous system depression, the compounds of the present invention differ from known psychoactive agents, all of which cause marked depression in experimental animals. Thus, they inhibit the aggressive behavior of septal rats and inhibit isolation-induced fighting behavior in mice in doses much below those required to produce central nervous system depression or other signs of neurotoxicity.

The compounds of the present invention each have a neuropharmacological profile [see Samuel Irwin, Science, 136, 123 (1962)] in mice which resembles those of the major tranquilizers such as chlorpromazine. These compounds differ from chlorpromazine, however, in that each is a much weaker depressant of motor activity in the mouse.

For instance, considering 3-(4-methyl - 5 - nitro-2-thiazolyl)-pyridine hydrochloride, as shown by the data hereinafter, this compound was found to be highly selective in abolishing aggressive behavior when administered in doses which caused little or no signs of central nervous system depression or toxicity. It was not a potent inhibitor of spontaneous motor activity in mice, nor did it produce neurotoxicity in mice to the extent that chlorpromazine does. It was outstanding in inhibiting septal rat aggression and fighting mouse behavior. In this respect, it is ten times more active than chlorpromazine when evaluated with respect to the neurotoxic effects of the drugs. It was inactive in inhibiting electroshock-induced fighting behavior in mice. Like chlorpromazine, it is virtually devoid of anticonvulsant activity. It differs from chlorpromazine, however, in that it does not protect against amphetamine aggregation-induced lethality. It is devoid of anti-depressant activity since it failed (1) to potentiate dihydroxyphenylalanine-induced fighting behavior in mice, (2) to potentiate lethality induced by yohimbine, and (3) to antagonize tetrabenazine-induced ptosis. It is well tolerated when administered orally.

The foregoing compound, 3-(4-methyl-5-nitro-2-thiazolyl)-pyridine hydrochloride, was studied in the neuropharmacological profile, which, as indicated above, is a standardized multi-dimensional observation technique used on mice to grade symptomatology and acute toxicity relative to dosage.

In a dose range of 3 to 300 mg./kg., it produced depression, reduced motor activity, hyporeflexia and hypothermia. No convulsions were observed at any level. Depending on the dosage used, the onset of action varied between 15 and 30 minutes and the effects lasted for approximately 30 minutes to several hours. The results of the neuropharmacological profile indicate that this compound is a central nervous system depressant having sedative properties.

A number of other 4-substituted-2-(3-pyridyl)thiazoles exhibited a neuropharmacological profile similar to that of 3-(4-methyl - 5 - nitro-2-thiazolyl)pyridine hydrochloride. The following Table lists the various compounds which exhibited a desirable profile. In this Table, the substituents R and R' have reference to the following structural formula:

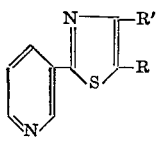

From the foregoing data, it is apparent that each of the above tested thiazoles showed, at doses which caused little or no signs of CNS depression or toxicity, selective abolition of aggressive behavior.

3-(4-methyl-5-nitro-2-thiazolyl)pyridine hydrochloride was subjected to additional evaluation tests, as described below.

Spontaneous Locomotor Activity 3-(4-methyl-5-nitro-2-thiazolyl)pyridine hydrochloride (hereinafter referred to as the nitrothiazole) being one of the compounds of the present invention, and chlorpromazine, a commonly used major tranquilizer, were each subjected to the spontaneous locomotor activity test, in which six mice or rats per dose were placed in individual photocell activity cages 30 minutes (mice) or 60 minutes (rats) after i.p. (intraperitoneal) administration of the drug, for a 30 minute activity count. Table II shows the results obtained by comparing drug treated groups with control activity, $SD_{50}$ being that dose which causes a 50% reduction from control activity.

TABLE II.—SPONTANEOUS LOCOMOTOR ACTIVITY

| | I.p. $SD_{50}$ (mg./kg.) | |
|---|---|---|
| | Mice | Rats |
| The nitrothiazole | 75.5 | 19.8 |
| Chlorpromazine | 2.8 | 1.7 |

The nitrothiazole appears to possess a much weaker depressant action in both mice and rats in comparison with chlorpromazine.

In addition, the nitrothiazole exhibited weak depressant activity when given orally, with an $SD_{50}$ of 800 mg./kg. in mice and greater than 600 mg./kg. in rats.

Neurotoxicity

In the neurotoxicity test, the value ($NTD_{50}$) is defined as the dose necessary to cause 50% of mice or rats trained to walk a rotating wooden rod (5 r.p.m.) to fall at this time of peak effect, and is a measure of drug effects on motor function or central nervous system toxicity. The results set forth in Table III were obtained when the nitrothiazole was tested against chlorpromazine.

TABLE III.—NEUROTOXICITY

| | $NTD_{50}$ (mg./kg.) | 95% confidence limits |
|---|---|---|
| Mice: | | |
| I.p.: | | |
| The nitrothiazole | 251.0 | (144.0–440.0) |
| Chlorpromazine | 0.7 | (0.5–1.1) |
| P.o.: | | |
| The nitrothiazole | >600 | |
| Chlorpromazine | 12.1 | (8.5–17.3) |
| Rats: | | |
| I.p.: | | |
| The nitrothiazole | 112.5 | (105.5–121.0) |
| Chlorpromazine | 5.3 | (3.1–9.1) |
| P.o.: | | |
| The nitrothiazole | 310.0 | (155.5–619.5) |
| Chlorpromazine | 11.0 | (6.1–19.9) |

Again, the nitrothiazole was considerably less potent than the chlorpromazine. In addition, the nitrothiazole appeared to be more toxic in rats than in mice.

TABLE I

| Compound | R' | R | IFM,* percent protected | $NTD_{50}$, i.p. mice (mg./kg.) | $ED_{50}$, (mg./kg.) I.p. mice | P.o. mice |
|---|---|---|---|---|---|---|
| 1 | —CH₃ | NO₂ (hydrochloride) | 80 | 251 (144.0–440.0) | 3.75 (1.39–10.2) | |
| 2 | —CH₃ | —C(CH₃)=N—OH | 40 | 960 | 33 (21.6–50.6) | 106.5 (95–120.5) |
| 3 | —CH₃ | —CON(C₂H₅)₂ (sulfate) | 60 | 90 (98.5–97.0) | 35.5 (15.4–84.1) | |
| 4 | —CH₃ | —CO·O·cyclohexyl | 40 | | | |
| 5 | —CONH₂ | H | 40 | | | |
| 6 | —CONHMe | H | 60 | 142 (98.6–156.0) | 26 (18.4–36.5) | 72 (28.8–181.0) |

*IFM=Isolated fighting mouse test at a dose of 30 mg./kg. intraperitoneal; those compounds which protected at least 40% of the mice in this test were considered to be active.

Anti-Aggressive Activity

The nitrothiazole was compared with chlorpromazine for its anti-aggressive activity. Four models of experimentally induced aggression in rodents were studied (R. D. Sofia, *Life Science*, 8: 705, 1969). The results of these experiments are summarized in Table IV.

TABLE IV.—ANTI-AGGRESSIVE ACTIVITY
[$ED_{50}$ (95% confidence limits) (mg./kg.)]

| Agent | I.p. | | P.o. | |
|---|---|---|---|---|
| | $ED_{50}$ | $NTD_{50}/ED_{50}$ | $ED_{50}$ | $NTD_{50}/ED_{50}$ |
| Isolated mouse aggression: | | | | |
| The nitrothiazole | 3.75 (1.39–10.2) | 67.0 | 25.2 (12.4–51.0) | >23.8 |
| Chlorpromazine | 2.8 (2.0–3.9) | 0.3 | 6.9 (5.1–9.4) | 1.8 |
| Electroshock-induced fighting in mice: | | | | |
| The nitrothiazole | (1) | | (1) | |
| Chlorpromazine | 5.5 (3.1–9.9) | 0.1 | 0.86 (0.38–1.88) | 14.0 |
| Septal rat aggression: | | | | |
| The nitrothiazole | 11.8 (2.5–29.6) | 9.6 | 21.2 (8.8–51.0) | 14.6 |
| Chlorpromazine | 10.7 (4.5–25.7) | 0.5 | 11.4 (6.1–21.4) | 0.9 |
| Killer rat aggression: | | | | |
| The nitrothiazole | 54.0 (30.3–96.0) | 2.1 | | |
| Chlorpromazine | 7.2 (4.3–11.8) | 0.2 | 17.4 (10.1–29.8) | 0.6 |

¹ Inactive.

When considering the results of these studies, it should be understood that drug specificity is considered selective only when aggressive behavior is inhibited at doses which are significantly lower than those which impair rotarod performance ($NTD_{50}$) or result in a $NTD_{50}/ED_{50}$ ratio of greater than 1. Based on the above criterion, chlorpromazine is considered non-selective in abolishing aggression in the isolated mouse and septal rat assays, except when administered orally in the isolated mouse assay, since it gave ratios of less than 1. The nitrothiazole gives ratios of 67.0 and 9.6, respectively, in isolated mouse and septal rat assays when administered intrapertioneally, and 23.8 and 14.6, respectively, in the same assays when administered orally. These high ratios indicate a high degree of specificity for inhibiting experimentally induced aggressive behavior. In addition, this degree of selectivity of the nitrothiazole for anti-aggressive activity is further supported by the fact that it is quite active at doses which are well below the doses inhibiting spontaneous locomotor activity. With respect to killer rat agression, the nitrothiazole was a weak inhibitor, while chlorpromazine was not specific in inhibiting this type of aggression. The nitrothiazole was ineffective as a blocker of electroshock-induced fighting in mice. Chlorpromazine would be considered inactive in this respect when administered intraperitoneally since it did block electroshock-induced fighting, but, only at neurotoxic doses. Orally, this compound was active in this test, exhibiting a ratio of 14.

Anti-Convulsant Activity

Anti-convulsant activity was tested according to the following procedures.

1. Maximal Electroshock Seizures ($MES_{50}$).—Groups of ten mice each were injected i.p. with a vehicle and the test drug and placed in individual Plexiglas squares. Thirty minutes after i.p. injection, each mouse was administered an electric shock transcorneally at 50mA intensity, 0.2 seconds duration (Swinyard, et al., *J. Pharmacol. Exptl. Ther.*, 106: 319, 1952). The criterion for activity is protection against tonic extension of the hind limbs. The dose necessary to protect 50% of the mice ($MES_{50}$) was determined. The following results were obtained.

TABLE V.—MAXIMAL ELECTROSHOCK SEIZURES

| Agent | I.p., $MES_{50}$, mg./kg. |
|---|---|
| The nitrothiazole | Inactive (100 mg./kg.). |
| Chlorpromazine | Inactive (25 mg./kg.). |

The nitrothiazole, like chlorpromazine, did not protect against maximal electroshock seizures even at high doses.

2. Pentylenetetrazol Seizures ($MET_{50}$).—In this test (modification of the method introduced by Everett and Richard, *J. Pharmacol. Exptl. Ther.*, 81: 402, 1944), groups of ten mice each are pretreated i.p. with vehicle and various doses of test compound and placed in Plexiglas squares. Thirty minutes later, all mice are injected subcutaneously (s.c.) with pentylenetetrazol at 125 mg./kg. and observed immediately thereafter for convulsions and death for a period of 1 hour. The dose necessary to protect 50% of the mice ($MET_{50}$) for both parameters was determined and reported in Table VI.

TABLE VI.—PENTYLENETETRAZOL SEIZURES

| Agent | I.p. $MET_{50}$, mg./kg. |
|---|---|
| The nitrothiazole | Inactive (200 mg./kg.). |
| Chlorpromazine | Inactive (100 mg./kg.). |

Neither the nitrothiazole nor chlorpromazine exhibited antipentylenetetrazol activity.

d-Amphetamine Aggregation

Protection from d-amphetamine aggregation-induced lethality is usually afforded by alpha-adrenergic-blocking agents such as chlorpromazine, phenoxybenzamine, etc. Percent protection was determined and an $ED_{50}$ value calculated. The results are summarized in Table VII.

TABLE VII.—d-AMPHETAMINE AGGREGATION

| Agent | $ED_{50}$, mg./kg. |
|---|---|
| The nitrothiazole | Inactive (100 mg./kg.). |
| Chlorpromazine | 1.2 (0.8–1.8). |

The nitrothiazole was inactive in this procedure. Chloropromazine was very active, probably due in part to the alpha-adrenergic blocking activity of this compound.

Body Temperature

The effects on rectal body temperature of the nitrothiazole and of chlorpromazine in mice were studied in a controlled environment (72° F.). Body temperature was recorded immediately before, and 15 minutes, 30 minutes, and every hour from one to five following drug administration. The results are set forth in Table VIII.

TABLE VIII.—BODY TEMPERATURE

| Agent (i.p. dose, mg./kg.) | Time to peak activ- ity, hr. | Degree C drop | Dura- tion, hr. |
|---|---|---|---|
| The nitrothiazole: (100) | 1 | 6 | 5 |
| Chlorpromazine: (2.5) | 1 | 8 | 5 |

The nitrothiazole was similar to chlorpromazine in its effects on body temperature with respect to time of peak activity after drug administration, the intensity of effect, and duration of action. However, on a milligram potency basis, chlorpromazine was approximately 40 times more active than the nitrothiazole.

Drug Interaction Studies

The nitrothiazole and chlorpromazine were compared in the following drug interaction studies.

1. Pentobarbital.—The nitrothiazole and chlorpromazine were administered at various doses intraperitoneally 30 minutes prior to a 50 mg./kg. i.p. injection of sodium pentobarbital. This procedure detects compounds which possess analeptic or potentiating properties. The duration of sleeping time, as measured by loss of righting reflex, was determined. The results are presented as percent of control sleeping time and are shown in Table IX.

TABLE IX.—PERCENT INCREASE IN CONTROL SLEEP TIME

| I.p. dose, mg./kg. | The nitrothiazole | Chlorpromazine |
|---|---|---|
| 0.5 | | 124 |
| 1.0 | | 240 |
| 2.0 | | 300 |
| 20 | 12.0 | |
| 40 | 27.0 | |
| 80 | 79.5 | |
| 160 | 200 | |

On a dose to dose relationship, the nitrothiazole appears to have approximately $\frac{1}{200}$ the potency of chlorpromazine. That is 160 mg./kg. of the nitrothiazole achieve a potency intermediate the potency achieved with 0.5 mg./kg. and that achieved with 1 mg./kg. of chlorpromazine. Therefore, the nitrothiazole shows potentiation of barbiturate anesthesia.

2. Dihydroxyphenylalanine (dl-DOPA) Fighting Test.—It is well known that when monoamine oxidase inhibitors are administered prior to the administration of dl-DOPA, which is a noradrenaline precursor, convulsions or excitation occur. In this study, the MAO inhibitor pargyline (80 mg./kg.) was given 1, 2, and 4 hours prior to administering 200 mg./kg. of dl-DOPA. Results of this experiment are manifested by excitation, salivation, jumping, and fighting. When the nitrothiazole (100 mg./kg.) and the chlorpromazine (5 mg./kg.) were administered instead of pargyline, these symptoms were not observed. Thus, in this procedure, neither of the agents tested appears to be an MOA inhibitor.

3. Yohimbine Potentiation.—Potentiation of lethality induced by the alpha-adrenegic blocking agent yohimbine is considered to be a reliable procedure to classify possible anti-depressant compounds (R. M. Quinton, *Brit. J. Pharmacol.*, 21: 51, 1963). An $ED_{50}$ in this test is defined as that dose of test drug which will cause the $LD_1$ (25 mg./kg., i.p.) of yohimbine to be converted to the $LD_{50}$ value. Groups of ten mice each were placed in a tote box and injected with vehicle or test drug. Thirty minutes later, each mouse was injected i.p. with 25 mg./kg. of yohimbine. Sixty minutes after yohimbine administration, the number of deaths in each tote box for each dose of test drug was recorded. (Vehicle-treated mice should have no more than one of ten mice dead.) Neither chlorpromazine (100 mg./kg.) nor the nitrothiazole (100 mg./kg.) was active in this test.

4. Antagonism of Tetrabenazine-induced Ptosis.—Since the nitrothiazole was very weakly active in the killer rat aggression test, which appears to detect anti-depressant activity, it is possible that this agent might possess weak anti-depressant activity at doses which cause neurotoxicity. Hence, another test for detection of anti-depressant activity was conducted.

Groups of mice were given 32 mg./kg. of tetrabenazine intraperitoneally 30 minutes after an injection of the nitrothiazole (30 mg./kg.). The degree of ptosis (eyelid drooping or closure) was then determined exactly 30 minutes after tetrabenazine administration. The nitrothiazole did not reverse tetrabenazine-induced ptosis, as do the anti-depressants desipramine or amitriptyline.

5. Oxotremorine Antagonism.—Antagonism of the pharmacological effects of oxotremorine, a potent cholinergic stimulant, was studied in mice after intraperitoneal administration of the nitrothiazole (100 mg./kg.). (F. Sjoqust and J. Gillette, *Life Sci.*, 4: 1031, 1965.) In this test, groups of ten mice were individually placed into Plexiglas squares. They were injected i.p. with the vehicle or test drug thirty minutes prior to an i.p. injection of 0.5 mg./kg. of oxotremorine. Immediately following oxotremorine administration, the mice were observed for salivation and tremors. Peripheral anti-cholinergic activity was assessed by inhibition of salivation, and central activity by inhibition of tremors. At 100 mg./kg., the nitrothiazole was completely devoid of any anti-cholinergic activity.

Toxicity

Table X gives the results of five-day lethality studies following single injections of drug. All values presented represent tests conducted when animals were housed ten per cage. The nitrothiazole was compared with chlorpromazine. In these and all the preceding calculations, the method of Litchfield and Wilcoxon (*J. Pharmacol. Exptl. Thers* 96: 99, 1949) was used to estimate effective ($ED_{50}$) or lethal ($LD_{50}$) dose.

TABLE X

[$LD_{50}$ (95% confidence limits) mg./kg.]

| Agent | Mice | | Rats | |
|---|---|---|---|---|
| | I.p. | P.o. | I.p. | P.o. |
| The nitrothiazole | 400 (306–525) | 490 (389–617) | 212 (144–312) | 815 (769–863) |
| Chlorpromazine | 136 (106–174) | 280 (187–481) | 137 (133–141) | 357.7 (237.7–538.5) |

These data show that the nitrothiazole is less toxic than chloropromazine when administered i.p. or orally to mice and rats.

The compounds of the present invention, either alone or in the form of a pharmaceutical composition, may be administered to an animal subject in any of a number of forms and via any of several routes. Thus, the compounds or compositions thereof may be orally administered in the form of tablets, pills or capsules, or in the form of a solution or liquid suspension. They may also be administered in the form of a parenteral suspension or solution. The compounds or compositions thereof may also be administered rectally, in the form of a suppository.

When orally administering the compounds or compositions, use can be made of a tablet, pill or capsule consisting entirely of one of the desired compounds, although ordinarily a composition comprising an effective amount of the compound and varying amounts of one or more physiologically inert materials such as carriers, vehicles, binders and the like will be used. Additionally, the compounds may be orally administered in the form of a suspension thereof in a suitable vehicle such as a syrup.

When parenterally administering the compounds or compositions, use may be made of a parenteral solution or suspension of the compounds in a suitable solvent or suspension medium.

The compounds and compositions of the present invention may also be administered rectally in the form of a suppository comprising an effective amount of the desired compound and a suitable vehicle such as petroleum jelly.

The following examples are specific formulations of compositions according to the invention:

EXAMPLE 1

Tablets may be prepared by the compression of a wet granulation containing the following:

Ingredients: In each
   3 - (4-methyl-5-nitro-2-thiazolyl)pyridine hydrochloride _____mg__ 50
   Polyvinylpyrrolidone _____mg__ 6
   Lactose _____mg__ 25
   Alcohol, 3A, 200 proof _____ml__ 1
   Stearic acid _____mg__ 3
   Talc _____mg__ 4
   Corn Starch _____mg__ 15

Dosage: 1 tablet 3 times a day

EXAMPLE 2

A liquid suspension for oral administration may be prepared in the following formulation.

Ingredients: In each 5 cc.

| | |
|---|---|
| 3 - (4-methyl-5-nitro-2-thiazolyl)pyridine hydrochloride _____ mg__ | 50 |
| Sodium carboxymethylcellulose _____ mg__ | 5 |
| Syrup USP q.s. to _____ cc__ | 5 |

Dosage: 1 teaspoonful (5 cc.) every 3 to 4 hours.

EXAMPLE 3

Dry filled capsules (DFC) consisting of two sections of hard gelatin may be prepared from the following formulation:

Ingredients: In each

| | |
|---|---|
| 3 - (4-methyl-5-nitro-2-thiazolyl)pyridine hydrochloride _____ mg__ | 50 |

Ingredients: In each

| | |
|---|---|
| 3-(4-methyl-5-nitro-2-thiazolyl)pyridine hydrochloride _____ mg__ | 50 |
| Lactose USP, q.s. | |

Dosage: 1 capsule 3 times a day.

EXAMPLE 4

A parenteral suspension for intra-muscular administration may be prepared in the following formulation:

Ingredients: In each

| | |
|---|---|
| 3 - (4-methyl-5-nitro-2-thiazolyl)pyridine hydrochloride _____ mg__ | 20 |
| Isotonic solution (0.85% saline) _____ cc__ | 5 |
| Surfactant (a 1% solution of polysorbate 80 USP) _____ cc__ | 1 |

Dosage: Inject 1 cc. when needed.

EXAMPLE 5

A suppository capsule may be formulated as below:

Ingredients: In each

| | |
|---|---|
| 3 - (4-methyl-5-nitro-2-thiazolyl)pyridine hydrochloride _____ mg__ | 50 |
| Cocoa butter, q.s. | |

Dosage: 1 suppository every 3 to 4 hours.

Variations can, of course, be made without departing from the spirit and scope of the invention.

What is claimed is:

1. A method of preventing or inhibiting aggressive behavior in an animal subject characterized by the exhibition of aggressive behavior, said method comprising administering to an animal subject a thiazole compound [selected from the group consisting of compounds] of the formula:

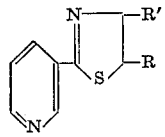

formula wherein R' is methyl,

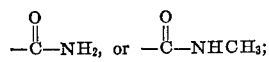

and wherein R is hydrogen,

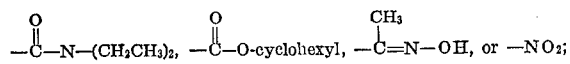

or a pharmaceutically acceptable acid addition salt thereof, said thiazole compound or salt being administered in an amount which is effective to prevent or inhibit aggressive behavior in an animal subject.

2. The method of claim 1, wherein said compound or salt is administered to said animal in an orally administrable dosage form.

3. The method of claim 2, wherein said orally administrable dosage form is a pill, tablet or capsule.

4. The method of claim 2, wherein said orally administrabled dosage form is a solution or suspension.

5. The method of claim 1, wherein said compound is administered to said animal in a parenterally administrable dosage form.

6. The method of claim 5, wherein said parenterally administrable dosage form is a solution or suspension.

7. The method of claim 1, wherein said compound or salt is administered to said animal in a rectally administrable dosage form.

8. The method of claim 7, wherein said rectally administrable dosage form is a suppository.

9. The method of claim 1, wherein said effective amount is from about 0.1 to about 100 mg./kg. of body weight of said animal per day.

10. The method of claim 9, wherein said amount is from about 1 to about 25 mg./kg. of body weight per day.

11. The method of claim 9, wherein said amount is from about 0.5 to about 2 mg./kg. of body weight per day.

12. The method of claim 1, wherein said thiazole compound is 3-(4-methyl-5-nitro-2-thiazolyl)pyridine hydrochloride.

13. A pharmaceutical preparation in dosage unit form adapted for administration to obtain an anti-aggressive behavior effect comprising an anti-aggressive-effective non-toxic amount within the range from about 0.1 to about 100 mg./kg. of body weight of a compound of the formula:

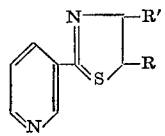

wherein R' is methyl,

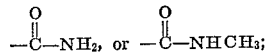

and wherein R is

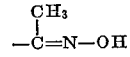

or —NO$_2$, or a pharmaceutically acceptable acid addition salt thereof, in combination with a physiologically acceptable carrier or diluent therefor.

14. The composition of claim 13, in an orally administrable dosage form.

15. The composition of claim 14, wherein said orally administrable dosage form is a pill, tablet or capsule.

16. The composition of claim 15, wherein said pill, tablet or capsule comprises about 25 to 50 mg. of said compound or salt.

17. The composition of claim 14, wherein said orally administrable dosage form is a suspension or solution.

18. The compositions of claim 17, wherein said suspension or solution comprises about 10 mg. of said compound or salt per cc.

19. The composition of claim 13, in a parenterally administrable dosage form.

20. The composition of claim 19, wherein said parenterally administrable dosage form comprises about 20 mg. of said compound or salt per 6 cc. of suspension or solution.

21. The composition of claim 13, in a rectally administrable dosage form.

22. The composition of claim 21, wherein said rectally administrable dosage form is a suppository.

23. The composition of claim 22, wherein said suppository contains about 20 to 50 mg. of said thiazole compound or salt.

24. The composition of claim 13, wherein said thiazole compound is 3-(4-methyl-5-nitro-2-thiazolyl)pyridine hydrochloride.

References Cited

FOREIGN PATENTS 7007029  11/1969  Netherlands ........ 260—294.8

STANLEY L. FRIEDMAN, Primary Examiner

U.S. Cl. X.R.

260—294.8

UNITED STATES PATENT OFFICE
CERTIFICATE OF CORRECTION

Patent No. 3,842,172  Dated  October 15, 1974

Inventor(s) Zaven S. Ariyan and William A. Harrison

It is certified that error appears in the above-identified patent and that said Letters Patent are hereby corrected as shown below:

Column 1, line 5: change "Middleroad" to --Woodbury--.

Column 3, line 49: change "DESCRIPPTION" to --DESCRIPTION--.

Column 4, lines 34-39: that portion of the formula reading

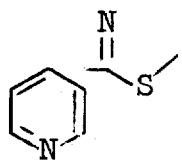  should read  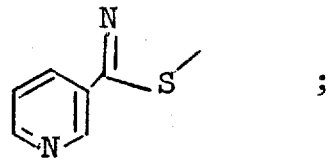 ;

line 41: change "outline to --outlined--;
line 51: change "neutroleptics" to --neuroleptics--;
line 66: change "neutrotoxicity" to --neurotoxicity--.

Column 5, TABLE I, Compound 2: delete "+" in R column;
line 24: change "deviod" to --devoid--.

Column 7, line 34: change "intrapertioneally" to --intraperitoneally--.

Column 9, line 72: change "Sjoqust" to --Sjoquist--.

Column 10, line 15: change "Thers 96" to --Ther. 96--.

Column 11, line 9: change "g.s." to --q.s.--;
lines 20-23: delete "Ingredients: . . . mg 50";
lines 53-54: delete "[selected . . . compounds]";

UNITED STATES PATENT OFFICE
CERTIFICATE OF CORRECTION

Patent No. 3,842,172   Dated October 15, 1974

Inventor(s) Zaven S. Ariyan and William A. Harrison

It is certified that error appears in the above-identified patent and that said Letters Patent are hereby corrected as shown below:

lines 56-59: that portion of the formula reading

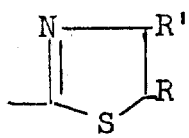   should read   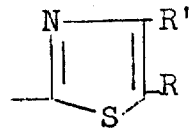

Column 12, line 7: change "trabled" to --trable--;
line 8: after "compound", insert --or salt--;
lines 37-40: that portion of the formula reading

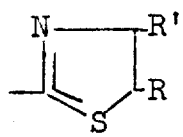   should read   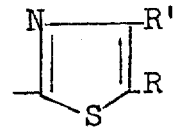

Signed and sealed this 21st day of January 1975.

(SEAL)
Attest:

McCOY M. GIBSON JR.
Attesting Officer

C. MARSHALL DANN
Commissioner of Patents